UNITED STATES PATENT OFFICE 2,043,329

WETTING AGENTS FOR MERCERIZING SOLUTIONS

Ferdinand Münz and Otto Bayer, Frankfort-on-the-Main, Germany, assignors to General Aniline Works, Inc., New York, N. Y., a corporation of Delaware No Drawing. Application June 8, 1933, Serial No. 674,922. In Germany June 14, 1932

6 Claims. (Cl. 8—20)

Our invention relates to valuable wetting agents which are particularly suitable for use in mercerizing solutions. They are obtained by reacting carbon disulfide, advantageously with the addition of an alkali hydroxide, and aliphatic secondary amines, of which one alkyl-group contains a chain of at least 3 carbon atoms and the other may have any number of carbon atoms and may be linked for example with a further alkylamine residue.

The amides of dithiocarbonic acid of the general formula:

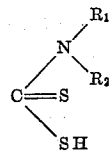

$R_1$ being an alkyl-group containing at least 3 carbon atoms, $R_2$ being any alkyl-group which may contain a further alkylamine radicle, thus formed have an excellent wetting effect in strong caustic alkali solutions, they are very resistant towards alkaline solutions and cause foaming only to a small degree; they therefore fulfill all practical requirements.

As in the case of other wetting agents the wetting effect of the present products may be increased by adding solvents or other substances which are per se difficultly soluble in strong caustic alkaline solutions since the above amides of dithiocarbonic acid are distinguished by a good dissolving or dispersing power for the said additional substances. The addition of well known dispersing agents, such as phenols, sulfurized phenols or highly sulfonated oils may be of advantage in many cases.

In order to further illustrate our invention the following examples are given, the parts being by weight and all temperatures in degrees centigrade. However, we wish it to be understood that our invention is not limited to the particular products nor reacting conditions mentioned therein:

Example 1

To 100 parts of di-n-propylamine 200 parts of a caustic soda solution of 30° Bé. and 80 parts of carbon disulfide are added and when the reaction is complete the excess of carbon disulfide is removed. Crude cotton is wetted almost immediately by a customary mercerizing solution of 28–32° Bé. containing 1% of the product of the probable formula:

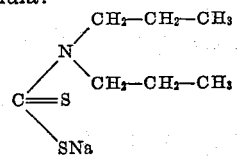

Similar products are obtained by substituting the di-n-propylamine used above by equimolecular proportions of the following secondary amines:

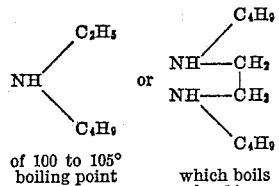

of 100 to 105° boiling point — which boils under 14 mm pressure at 116 to 120°

The first secondary amine is obtained by reducing the azomethine from n-butyr-aldehyde and ethylamine of the formula $$C_4H_8=N-CH_2-CH_3,$$

the latter secondary amine by reducing the azomethine from n-butyr-aldehyde and ethylenediamine of the formula:

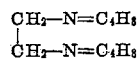

The corresponding new amides of dithiocarbonic acids have the probable formulae:

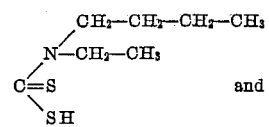 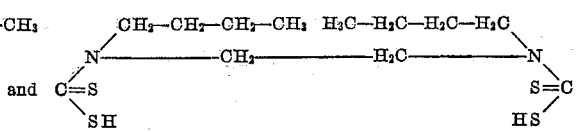

Example 2

When using the di-n-butylamide of the probable formula

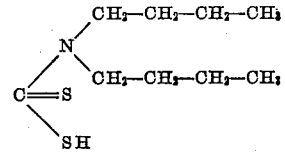

opaque mercerizing solutions are obtained of a wetting power which is better than that of the product of Example 1. Clear solutions of an excellent wetting power may be obtained by adding a suitable dispersing agent.

*Example 3*

80 parts of the di-propylamide of Example 1 are mixed with 20 parts of the di-butylamide of Example 2. A customary mercerizing solution of 30° Bé. containing a clear solution of 0.5% of said mixture shows an excellent wetting and shrinking effect towards crude cotton.

*Example 4*

38 parts of carbon disulfide are added to 113 parts of n-butyl-mono-ethanol-amine while cooling. The formed product being probably the butyl-ethanol-amine salt of the dithiocarbonic acid butyl-mono-ethanol-amide of the probable formula

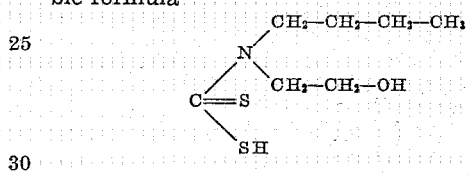

is easily soluble in mercerizing solutions and represents an excellent wetting agent.

*Example 5*

To 129 parts of di-n-butylamine and 120 parts of a caustic soda solution of 40° Bé. at 20 to 25° 76 parts of carbon disulfide are added. The pulp of crystals thus formed is then dissolved in 1000 parts of crude cresol and 1400 parts of crude xylenol. The mixture thus obtained represents a very effective wetting agent for mercerizing solutions.

We claim:

1. Wetting agents for mercerizing solutions comprising mixtures of a dithiocarbonic acid amide of the general formula

wherein Alk means an alkali metal and $R_1$ represents an alkyl-group containing at least 3 carbon atoms, $R_2$ any alkyl-group or any alkylamino alkyl group, and a dispersing agent selected from the group consisting of phenols, sulfurized phenols and highly sulfonated oils.

2. Wetting agents for mercerizing solutions comprising mixtures of a dithiocarbonic acid amide of the general formula

wherein Alk means an alkali metal and $R_1$ represents an alkyl-group containing at least 3 carbon atoms, $R_2$ any alkyl-group or any alkylamino alkyl group, and a phenol.

3. Alkaline mercerizing solutions containing as a wetting agent a dithiocarbonic acid amide of the general formula

wherein Alk means an alkali metal and $R_1$ represents an alkyl-group containing at least 3 carbon atoms, $R_2$ any alkyl-group or any alkylamino alkyl group.

4. A wetting agent for mercerizing solutions comprising a mixture of the dithiocarbonic acid-di-n-butylamide of the formula

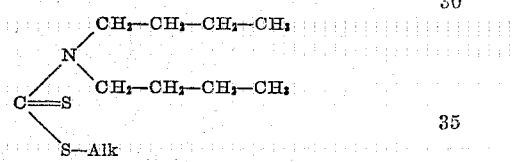

wherein Alk means an alkali metal and of crude cresol and crude xylenol.

5. Alkaline mercerizing solutions containing as a wetting agent the dithiocarbonic acid-di-n-propylamide of the formula

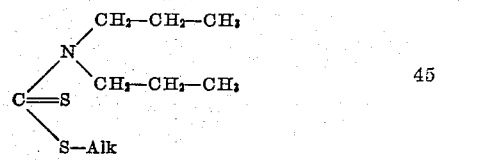

wherein Alk means an alkali metal.

6. Alkaline mercerizing solutions containing as a wetting agent the dithiocarbonic acid-butyl-ethanol-amide of the formula

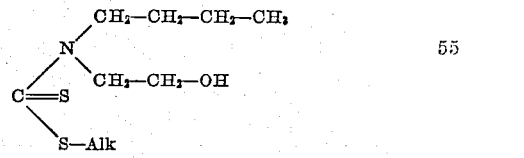

wherein Alk means an alkali metal.

FERDINAND MÜNZ.
OTTO BAYER.